(12) United States Patent
Dong et al.

(10) Patent No.: US 10,253,811 B2
(45) Date of Patent: Apr. 9, 2019

(54) ADHESIVE, BEARING WITH THE ADHESIVE, AND METHODS OF MAKING

(71) Applicant: SAINT-GOBAIN PERFORMANCE PLASTICS CORPORATION, Solon, OH (US)

(72) Inventors: Jing Dong, Shrewsbury, MA (US); Nafih Mekhilef, Shrewsbury, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 63 days.

(21) Appl. No.: 15/275,114

(22) Filed: Sep. 23, 2016

(65) Prior Publication Data

US 2017/0089390 A1    Mar. 30, 2017

Related U.S. Application Data

(60) Provisional application No. 62/232,886, filed on Sep. 25, 2015.

(51) Int. Cl.
*F16C 33/20*    (2006.01)

(52) U.S. Cl.
CPC .......... *F16C 33/201* (2013.01); *F16C 33/208* (2013.01); *F16C 2208/32* (2013.01); *F16C 2208/36* (2013.01); *F16C 2210/04* (2013.01); *F16C 2240/60* (2013.01)

(58) Field of Classification Search
CPC . F16C 33/201; F16C 2208/36; F16C 2208/32
See application file for complete search history.

(56) References Cited

U.S. PATENT DOCUMENTS

| 4,897,439 A | 1/1990 | Rau et al. |
| 6,140,410 A * | 10/2000 | Kolouch ................. C08L 27/12 524/520 |
| 8,840,308 B2 * | 9/2014 | Ortiz ......................... B32B 1/08 384/276 |
| 2010/0173093 A1 | 7/2010 | Radcliffe |
| 2012/0275731 A1 | 1/2012 | Ziegler et al. |
| 2012/0128280 A1 | 5/2012 | Ortiz |
| 2013/0196581 A1 | 8/2013 | Boutaghou |
| 2014/0010484 A1 * | 1/2014 | Schmitjes ............... F16C 33/04 384/42 |
| 2014/0100144 A1 | 4/2014 | Ziegler et al. |
| 2015/0132498 A1 | 5/2015 | Hardgrave et al. |

FOREIGN PATENT DOCUMENTS

WO    2012149447 A1    11/2012

OTHER PUBLICATIONS

International Search Report and Written Opinion dated Jan. 9, 2017, with regard to International Application No. PCT/US2016/053563, 15 pgs.

* cited by examiner

*Primary Examiner* — Nicole M. Buie-Hatcher
(74) *Attorney, Agent, or Firm* — Abel Law Group, LLP; Chi Suk Kim (57) ABSTRACT

Embodiments of the present disclosure are directed to an adhesive layer, bearing including the adhesive layer, and methods of forming. The adhesive layer can include a mixture of a first polymer, a second polymer, and a third polymer, wherein the third polymer is a modified fluoropolymer of the second polymer. In a particular embodiment, a weight ratio of a weight content of the second polymer to a weight content of the third polymer in the mixture can be at least 12:1. In another particular embodiment, the adhesive layer can have a normalized peel strength of at least 4.8 N/in/microns.

19 Claims, 3 Drawing Sheets

ADHESIVE, BEARING WITH THE ADHESIVE, AND METHODS OF MAKING

CROSS-REFERENCE TO RELATED APPLICATION

This application claims priority under 35 U.S.C. § 119(e) to U.S. Provisional Patent Application 62/232,886 entitled "Adhesive, Bearing With The Adhesive, And Methods Of Making," by Jing Dong, et. al., filed Sep. 25, 2015, which is assigned to the current assignee hereof and incorporated herein by reference in its entirety.

FIELD OF THE DISCLOSURE

The present disclosure relates to an adhesive layer, a bearing including the adhesive layer, and methods of making the adhesive layer and bearings with the adhesive layer.

BACKGROUND

Some adhesives can be used in bearing production. In some applications, applying an adhesive on a metal support may require an operation at a high temperature, such as at least 300° C. Polymers used in adhesives, for instance, modified PFA, may not retain a desirable viscosity at such high temperatures, which can cause problems during lamination. In certain applications, adhesive layers may be used to bond a polymer layer and a metal support, which requires sufficient adhesion strength of the adhesives to both materials to avoid failure of bonding. The industry continues to demand improved adhesives for manufacture of bearings.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the arts this disclosure belongs to.

Embodiments disclosed herein relate to an adhesive layer. The adhesive layer can include a first polymer, a second polymer, and a third polymer, wherein the second polymer can include a fluoropolymer, and the third polymer can include a modified fluoropolymer of the second polymer. The adhesive layer can maintain a high complex viscosity at a high temperature, such as at least 300° C., which may allow the adhesive layer to be particularly suitable for applications that employ lamination processes. For example, the adhesive layer can be disposed between a substrate and a sliding layer to form a bearing without causing oozing problems. Further, the adhesive layer can have other improved properties, such as increased peel strength.

Other embodiments relate to methods of forming an adhesive layer. The methods can include mixing a third polymer with a first polymer and a second polymer. The first polymer and the second polymer can be different from one another and immiscible. In the presence of the third polymer, the mixture can form a uniform dispersion, which can allow conventional processing technologies to be conducted and formation of adhesive layers with improved properties.

According to an embodiment, the adhesive layer can include a mixture including a first polymer, a second polymer, and a third polymer. The first and the second polymers can be different from one another and immiscible. The third polymer can be different from the first polymer and the second polymer. In a particular embodiment, the mixture can consist essentially of the first polymer, the second polymer, and the third polymer. In a more particular embodiment, the adhesive layer can consist essentially of the first polymer, the second polymer, and the third polymer.

In an embodiment, the first, second, and third polymers can be mixed at certain weight contents relative to a total weight of the first polymer, the second polymer, and the third polymer. For example, the first polymer can have a weight content of at least 1 wt. %, such as at least 5 wt. %, at least 8 wt. %, at least 11 wt. %, or at least 17.2 wt. % of the mixture of the polymers. Such weight content of the first polymer can permit improved mechanical resistance, chemical resistance, or other properties of the adhesive layer. In another example, the weight content of the first polymer may be not greater than 28 wt. %, such as not greater than 25 wt. %, not greater than 23 wt. %, or not greater than 20 wt. %. It is to be appreciated that the first polymer can have a weight content in a range including any of the minimum and maximum percentages disclosed herein. For example, the weight content can be in a range of 1 wt. % to 28 wt. %, or in a range of 8 wt. % to 25 wt. %, or in a range of 11 wt. % to 23 wt. %.

According to an embodiment, the first polymer can have a melting temperature of at least 250° C., such as at least 280° C. In another embodiment, the first polymer may have a melting temperature not greater than 350° C., such as not greater than 330° C. It is to be understood the melting temperature of the first polymer can be in a range including any of the minimum and maximum values disclosed herein. For example, the melting temperature of the first polymer can be in a range of 250 to 350° C., for instance, in a range of 280° C. to 330° C.

According to an embodiment, the first polymer can have a melt flow rate of at least 0.5 g/10 min, at least 1 g/10 min, or at least 3 g/10 min as measured according to ASTM D-1238. In a further embodiment, the first polymer may have a melt flow rate of no greater than 20 g/10 min, no greater than 18 g/10 min, or no greater than 15 g/10 min as measured according to ASTM D-1238. It can be appreciated that the first polymer can have a melt flow rate in a range of any of the minimum and maximum values provided herein. For example, the melt flow rate of the first polymer can be in a range including 0.5 g/10 min to 20 g/10 min, in a range including 1 g/10 min to 18 g/10 min, or in a range including 3 to 15 g/10 min as measured according to ASTM D-1238.

According to an embodiment, the first polymer can include an aromatic polyester, a polyphenylene ether (hereinafter referred to as PPE), a liquid crystal polymer (hereinafter referred to as LCP), a polyether ether ketone (hereinafter referred to as PEEK), a polyaryletherketones (hereinafter referred to as PAEK), a polyether ketone (hereinafter referred to as PEK), polyimide (hereinafter referred to as PI), a polyamideimide (hereinafter referred to as PAI), thermoplastic polyimide (hereinafter referred to as PI), polyetherimide (hereinafter referred to as PEI), polyethersulfone (hereinafter referred to as PES), Polyphenylene sulfide (hereinafter referred to as PPS), polyphenylsulfone (hereinafter referred to as PPSU), polyphthalamide (hereinafter referred to as PPA), polycarbonate (hereinafter referred to as PC), aromatic and linear polyamides, or a combination thereof. In another embodiment, the first polymer may be a polymer other than a fluoropolymer. In a particular embodiment, the first polymer can include PEEK. In a more particular embodiment, the first polymer can consist essentially of PEEK.

According to an embodiment, the second polymer in the mixture can have a weight content relative to a total weight of the first, second, and third polymers. For instance, the second polymer can have a weight content of at least 61 wt. %, such as at least 63 wt. %, at least 68 wt. %, or at least 73 wt. %. In another embodiment, the weight content of the second polymer may be not greater than 98.5 wt. %, not greater than 93 wt. %, or not greater than 90 wt. %. It can be appreciated that the second polymer can have a weight content in a range including any of the minimum and maximum percentages disclosed herein. For example, the weight content can be in a range of 63 wt. % to 98.5 wt. %, in a range of 68 wt. % to 93 wt. %, or in a range of 73 wt. % to 90 wt. %.

In an embodiment, the second polymer can have a melting temperature greater than the melting temperature of the first polymer. For example, the second polymer can have a melting temperature of at least 220° C., such as at least 240° C. In another embodiment, the second polymer may have a melting temperature not greater than 340° C., such as not greater than 310° C. It is to be understood the melting temperature of the second polymer can be in a range including any of the minimum and maximum values disclosed herein. For example, the melting temperature of the second polymer can be in a range of 220-340° C., such as in a range of 240° C. to 310° C.

According to an embodiment, the second polymer can have a melt flow rate of at least 1 g/10 min, at least 1.5 g/10 min, or at least 2 g/10 min as measured according to ASTM D-1238. In a further embodiment, the melt flow rate of the second polymer may be not greater than 15 g/10 min, no greater than 10 g/10 min, or no greater than 7 g/10 min as measured according to ASTM D-1238. It can be appreciated that the second polymer can have a melt flow rate in a range including any of the minimum and maximum values provided herein. For example, the melt flow rate can be in a range of 1 g/10 min to 25 g/10 min, in a range of 1.5 g/10 min to 10 g/10 min, or in a range of 2 to 7 g/10 min as measured according to ASTM D-1238.

According to an embodiment, the second polymer can include a fluoropolymer. An exemplary fluoropolymer can include a perfluoroalkoxyethylene (hereinafter referred to as PFA), a ethylene-tetrafluoroethylene (hereinafter referred to as ETFE), a tetrafluoroethylene-hexafluoropropylene (hereinafter referred to as FEP), a tetrafluoro-ethylene-perfluoro (methyl vinyl either) (hereinafter referred to as MFA) and an ethylene chlorotrifluoroethylene copolymer (hereinafter referred to as ECTFE), or a combination thereof. In an embodiment, the second polymer can include any one or more of the fluoropolymers disclosed herein. For example, the second polymer can include PFA, ETFE, FEP, MFA, ECTFE, or any combination thereof. In another instance, the second polymer can include PFA. In yet another instance, the second polymer can include ETFE. In a particular embodiment, the second polymer can consist of any one or more of the fluoropolymers disclosed herein. Particularly, in some applications, the second polymer can consist essentially of PFA. In other applications, the second polymer can consist essentially of ETFE, MFA, or a combination thereof.

According to an embodiment, the third polymer can have a weight content in the mixture relative to a total weight of the first polymer, the second polymer, and the third polymer. In an embodiment, the third content may be lower than the first content and the second content. In another embodiment, the third content may be greater than the first content, the second content, or both. In a further embodiment, the third content can be at least 0.5 wt. % to allow the adhesive layer to have an improved property, such as for example, increased peel strength. For instance, the third polymer can have a weight content of at least 0.9 wt. % or at least 1.6 wt. %. In a further embodiment, the third polymer may be present at a content not greater than 5 wt. %, which may be sufficient for achieving the improved properties of the adhesive layer. For instance, the third content may be not greater than 4.6 wt. % or not greater than 3.8 wt. %. It can be appreciated that the third polymer can have a weight content in a range including any of the minimum and maximum percentages disclosed herein. For example, the weight content can be in a range of 0.5 wt. % to 5 wt. %, such as in a range of 0.9 wt. % to 4.6 wt. % or in a range of 1.6 wt. % to 3.4 wt. %.

In other embodiments, it may be desired to increase the weight content of the third polymer in the mixture to be higher than 5 wt. %. For example, the third polymer content may be at least 5.2 wt. %, at least 7 wt. %, at least 15 wt. %, at least 26 wt. %, at least 30 wt. %. This may provide improved properties, such as even higher peel strength or elongation at break in a transversal direction of the adhesive layer. In another instance, the third polymer content may not exceed 70 wt. %, such as not greater than 62 wt. %, not greater than 55 wt. %, not greater than 45 wt. %, not greater than 40 wt. %. It is to be understood that the weight content of the third polymer in the mixture can be in a range including any of the minimum and maximum percentages disclosed herein. For instance, the third polymer can have a weight content in a range of 0.5 wt. % to 70 wt. %, such as in a range of 5.2 wt. % to 62 wt. %, in a range of 15 wt. % to 55 wt. %, or in a range of 26 wt. % to 45 wt. %. In another instance, the weight content can be in a range of 0.5 wt. % to 5 wt. % or in a range of 0.9 wt. % to 4.6 wt. %.

In an embodiment, the third polymer can have a melting temperature of at least 220° C., such as at least 240° C. In another embodiment, the third polymer may have a melting temperature not greater than 310° C., such as 290° C. It is to be understood the melting temperature of the third polymer can be in a range including any of the minimum and maximum values disclosed herein. For example, the melting temperature of the third polymer can be in a range of 220 to 310° C., such as in a range of 240° C. to 290° C.

According to an embodiment, the third polymer can have a melt flow rate of at least about 3 g/10 min, at least about 5 g/10 min, or at least about 8 g/10 min as measured according to ASTM D-1238. In a further embodiment, the melt flow rate of the third polymer may be not greater than about 25 g/10 min, no greater than about 22 g/10 min, or no greater than about 20 g/10 min as measured according to ASTM D-1238. It can be appreciated that the melt flow rate can be in a range of any of the minimum and maximum values provided herein. For example, the melt flow rate can be in a range of 3 g/10 min to 25 g/10 min, in a range of 5 g/10 min to 22 g/10 min, or in a range of 8 to 20 g/10 min as measured according to ASTM D-1238.

According to an embodiment, the third polymer can include a modified fluoropolymer of the second polymer. That is, the third polymer may include a modified version of the second polymer. As used herein, modification of a fluoropolymer can include incorporating a functional group into the fluoropolymer. The modified fluoropolymer may demonstrate improved properties as compared to the unmodified version of the fluoropolymer. For instance, a functional group can be added to change adhesive strength, melt flow rate, processability, and other properties of the unmodified fluoropolymer. The fluoropolymer may be modified by techniques known in the art. For example, irradiation or chemical modification.

In an embodiment, the functional group can include a hydroxyl group (—OH), an carbonyl fluoride (—COF), a carboxyl group (—COOH), a maleic anhydride group (—(CHCO)$_2$O), an acrylate group (—CH$_2$=CHCOOH), a glycidyl methacrylate group (—CH$_2$C(CH$_3$) COOCH$_2$ (CHCH$_2$O)), or a combination thereof. In another embodiment, the modified fluoropolymer can include the fluoropolymer of the second polymer modified with any one or more of the functional group disclosed herein. For instance, the modified fluoropolymer can include modified PFA, modified ETFE, modified FEP, modified MFA, modified ECTFE, or any combination thereof. In a particular embodiment, the second fluoropolymer can be modified with —COOH, —(CHCO)$_2$O, or a combination thereof. For instance, the modified fluoropolymer can include PFA modified with —COOH, —(CHCO)$_2$O, or a combination thereof. In a particular embodiment, the third polymer can consist of any one or more of the modified fluoropolymer disclosed herein. For example, the third polymer can consist essentially of modified PFA. In another instance, the third polymer can consist essentially of modified ETFE. In still another instance, the third polymer can consist essentially of modified MFA.

According to an embodiment, the adhesive layer can have a weight ratio ($W_2$:$W_3$) of the weight content of the second polymer ($W_2$) to the weight content of the third polymer ($W_3$) to facilitate formation of the adhesive layer with improved properties. In an embodiment, the weight ratio $W_2$:$W_3$ may be at least 12:1. For instance, the weight ratio $W_2$:$W_3$ can be at least 13:1, or at least 14:1, or at least 15:1. In another embodiment, the weight ratio $W_2$:$W_3$ may be not greater than 197:1, such as not greater than 85:1, not greater than 66:1, not greater than 45:1, or not greater than 30. It can be appreciated that the weight ratio $W_2$:$W_3$ can be in a range including any of the minimum and maximum ratios disclosed herein. For example, the weight ratio can be in a range of 12:1 to 197:1, in a range of 13:1 to 85:1, or in a range of 14:1 to 45:1.

According to an embodiment, the adhesive layer can have a weight ratio ($W_2$:$W_1$) of the weight content of the second polymer ($W_2$) to the weight content of the first polymer ($W_1$) to facilitate formation of the adhesive layer with improved properties. According to an embodiment, the weight ratio $W_2$:$W_1$ can be at least 2:1, at least 2.5:1, at least 3:1, at least 4:1, or at least 4.5:1. In another embodiment, the weight ratio $W_2$:$W_1$ may be not greater than 24:1, not greater than 20:1, not greater than 18:1, not greater than 14:1, not greater than 11:1, or not greater than 9:1. It can be appreciated that the weight ratio $W_2$:$W_1$ can be in a range including any of the minimum and maximum ratios disclosed herein. For example, the weight ratio can be in a range of 2:1 to 24:1, in a range of 3:1 to 18:1, or in a range of 4:1 to 9:1.

According to an embodiment, the adhesive layer can have a weight ratio $W_1$:$W_3$ of the weight content of the first polymer ($W_1$) to the weight content of the third polymer ($W_3$) to facilitate formation of the adhesive layer with improved properties. According to an embodiment, the weight ratio $W_1$:$W_3$ can be at least 1:1, at least 2:1, or at least 3:1. In another embodiment, the weight ratio $W_1$:$W_3$ may be not greater than 55:1, not greater than 34:1, or not greater than 20:1. It can be appreciated that the weight ratio $W_1$:$W_3$ can be in a range including any of the minimum and maximum ratios disclosed herein. For example, the weight ratio can be in a range of 1:1 to 55:1, in a range of 2:1 to 34:1, or in a range of 3:1 to 20:1.

The first, second, and third polymers can be mixed to have the weight content, weight ratio, or both as disclosed herein. For example, the weight content of the third polymer may be not greater than that of the first polymer, the second polymer, or both. In a further embodiment, the weight content or weight ratio of the polymers can be selected to form the adhesive layer with desired properties. In a particular embodiment, the weight content of the third polymer can be selected to facilitate formation of the adhesive layer with desired properties.

In an embodiment, the third polymer can serve as a compatibilizer for the first polymer and the second polymer such that the mixture including the first, second, and third polymers can form a uniform dispersion. In an embodiment, the mixture can include a continuous phase of the second polymer with the first polymer evenly dispersed within the continuous phase. In a further embodiment, at least 90% of the first polymer within the second polymer phase may have a domain size of not greater than 20 microns, such as not greater than 18 microns, or not greater than 15 microns. In another embodiment, at least 90% of the first polymer within the second polymer phase can have a domain size of at least 1 micron, such as at least 3 microns or at least 5 microns. It is to be appreciated that at least 90% of the first polymer inside the second polymer can have a domain size in a range including any of the minimum and maximum values disclosed herein, such as in a range of 1 microns to 20 microns or in a range of 5 microns to 18 microns. In another embodiment, at least 95% or at least 98% of the first polymer within the continuous phase can have the domain size disclosed herein. Such domain size can help to maintain the morphological stability of the compound resulted from the mixture disclosed herein and prevent coalescence of domains of the first polymer, thus improving the mechanical strength of the adhesive layer formed therefrom.

In another embodiment, the third polymer can improve the processability of the mixture. For instance, a mixture of the first polymer (e.g. PEEK) and the second polymer (e.g. PFA) may not be continuously compounded, for example, by a twin-screw compounder, due to the incompatibility of the polymers, particularly when the first polymer has a weight content higher than 17 wt. % relative to the total weight of the first and second polymers. Adding the third polymer (e.g. mPFA) can allow continuous processing of the mixture under the same compounding condition, regardless of the weight content of the first polymer. For instance, in the presence of the third polymer, the weight content of the first polymer in the mixture can be higher than 17 wt. %, such as at least 18 wt. %, at least 19.5 wt. %, at least 20 wt. %, or even up to 28 wt. %, while exhibiting minimal effect on the processiblity of the mixture.

Accordingly, in an embodiment, forming the adhesive layer can include blending the first, second, and third polymers to form a uniform dispersion. In another embodiment, the mixture of the first, second, and third polymers can have two melting temperatures, and both are between the melting temperature of the first polymer and that of the second polymer. Having such melting temperatures can be an indication of improved compatibility between the first polymer and the second polymer in the mixture, which may result in improved properties of the compound resulted from the mixture. In the absence of the third polymer, the mixture of the first and second polymers can have two melting temperatures that are exactly the melting temperatures of the first and second polymers due to immiscibility of the first and second polymers. In a further embodiment, the mixture can be compounded and extruded, for instance by using a screw driven extruder, to form the adhesive layer.

According to an embodiment, the adhesive layer can be formed to have a particular peel strength. As disclosed herein, peel strength is measured by a 180° T-peel test according to ASTM D1876-01 and tested on a five-layer laminate structure. The laminate structure includes in the order from bottom to top, a first cold rolled steel backing, a first layer of the adhesive layer, a sliding layer, a second layer of the adhesive layer, and a second cold rolled steel backing. Strips of the specimens of each layer having a width of 25 mm are placed on top of one another as disclosed herein and pressed using a lab scale press for 5 min at 380° C. In the T-peel test, the steel backings are pulled apart using clamps and the peel force needed for detaching the steel backings is measured using an Instron mechanical testing system (e.g., 3369 Dual Column Universal testing system). Sliding layers having different compositions can be used to perform the test.

In an embodiment, the adhesive layer can have a peel strength of at least 140 N/in, such as at least 145 N/in, at least 150 N/in, at least 170 N/in, or at least 175 N/in. In another embodiment, peel strength may be not greater than 250 N/in, such as not greater than 220 N/in, not greater than 200 N/in, or not greater than 190 N/in. It is to be understood that peel strength of the adhesive layer may be in a range including any of the minimum and maximum values disclosed herein. For instance, the adhesive layer can have peel strength in a range of 140 N/in to 250 N/in, in a range of 145 N/in to 220 N/in, or in a range of 150 N/in to 200 N/in.

The peel strength may be changed by adjusting thickness of the adhesive layer. For instance, increasing the thickness of the adhesive layer can increase the peel strength. In some applications, a thicker adhesive layer may be desired to provide a stronger bonding. In an embodiment, the thickness of the adhesive layer can be at least 15 microns, such as at least 18 microns, at least 20 microns, at least 22 microns, at least 25 microns, or at least 30 microns. In another embodiment, the thickness may be not greater than 56 microns, not greater than 48 microns, not greater than 43 microns, or not greater than 40 microns. It is to be understood that the thickness of the adhesive layer can be in a range including any of the minimum and maximum values disclosed herein. For example, the thickness of the adhesive layer can be in a range of 15 microns to 56 microns, in a range of 20 microns to 48 microns, or in a range of 25 microns to 43 microns.

In a further embodiment, the adhesive layer can have a normalized peel strength. The normalized peel strength may be determined by normalizing the peel strength relative to the thickness of the adhesive layer. In another embodiment, normalized peel strength of the adhesive layer may be changed by adjusting the weight content of the third polymer. For a mixture of the first polymer and the second polymer, normalized peel strength may not be greater than 3.9 N/in/microns. However, adding the third polymer to the mixture can improve the normalized peel strength, even when the weight content of the third polymer is not greater than 5 wt. %. For example, the adhesive layer can have a normalized peel strength of at least 4.8 N/in/microns, such as at least 5.3 N/in/microns or at least 5.5 N/in/microns. In another instance, the normalized peel strength of the adhesive layer may not be greater than 20 N/in/microns, such as not greater than 12 N/in/microns, not greater than 7.3 N/in/microns, not greater than 7.1 N/in/microns, or not greater than 6.3 N/in/microns. It is to be appreciated that normalized peel strength can be in a range including any of the minimum and maximum values disclosed herein. For example, the normalized peel strength can be in a range of 4.8N/in/microns to 20 N/in/microns, in a range of 4.8N/in/microns to 12 N/in/microns, in a range of 4.8N/in/microns to 7.3 N/in/microns, in a range of 5.3 N/in/microns to 7.1 N/in/microns, or in a range of 5.5 N/in/microns to 6.3 N/in/microns. In another embodiment, increasing the weight content of the third polymer to be higher than 5 wt. % can further increase normalized peel strength.

According to an embodiment, the adhesive layer can have an elongation at break along a longitudinal direction and an elongation at break along a transverse direction. As disclosed herein, the longitudinal direction can be the extrusion direction, and the transversal direction can be perpendicular to the longitudinal direction. The elongation at break along the longitudinal direction is calculated by formula $(L_{break}-L_o)/L_o \times 100\%$, where $L_{break}$ is the length at break of the adhesive layer, and Lo is the original length of the adhesive layer before being stretched along the longitudinal direction. The elongation at break along the transverse direction is calculated by formula $(W_{break}-W_o)/W_o \times 100\%$, where $W_{break}$ is the width at break of the adhesive layer, and $W_o$ is the original width of the adhesive layer before being stretched along the transverse direction. The elongations at break along the two directions may be different or similar. In a particular embodiment, the elongation at break along the longitudinal direction may not be less than that along the transverse direction. As used herein, the elongation at break is measured in accordance with ASTM-D638.

In an embodiment, the adhesive layer can be formed to have a desirable elongation at break along the longitudinal direction, transversal direction, or both. In another embodiment, the elongation at break of the adhesive layer can be changed by adjusting the content of the third polymer. Particularly, including the third polymer to the mixture of the first polymer and the second polymer can improve elongation at break along the transverse direction of the mixture. In the absence of the third polymer, the elongation at break of mixture layer formed of the first and second polymers may not be greater than 10% in the transversal direction. However, including the third polymer at the weight content disclosed herein can allow the adhesive layer to have the elongation at break in the transversal direction higher than 10%.

In an embodiment, the elongation at break along the transverse direction of the adhesive layer can be at least 55%, such as at least 65% or at least 70%. In a further embodiment, the elongation at break along the transverse direction may not be greater than 95%, or not greater than 85%, or not greater than 80%. It is to be understood that the elongation at break along the transverse direction can be in a range including any of the minimum and maximum percentages disclosed herein. For example, the elongation at break along the transverse direction can be in a range of 55% to 95%, in a range of 65% to 85%, or in a range of 70% to 80%.

In another embodiment, the elongation along the longitudinal direction can be at least 85%, such as at least 95% or at least 105%. In another embodiment, the elongation at break along the longitudinal direction may not greater than 200%, not greater than 170%, or not greater than 150%. It is to be understood that the elongation at break along the longitudinal direction can be in a range including any of the minimum and maximum percentages disclosed herein. For example, the elongation at break along the longitudinal direction can be in a range of 85% to 200%, in a range of 95% to 170%, or in a range of 105% to 150%.

In a further embodiment, the adhesive layer can have a ratio of the elongation at break along the longitudinal direction to the elongation at break along the transverse direction. For instance, the ratio can be at least 1:1, such as at least 1.2:1, or at least 1.5:1. In another instance, the ratio may be not greater than 15:1, or not greater than 11:1, or not greater than 7:1. It is to be understood that the ratio of the elongation at break along the longitudinal direction to the elongation at break along the transverse direction can be in a range including any of the minimum and maximum ratios disclosed herein. For example, the ratio can be in a range of 1:1 to 15:1, in a range of 1.2:1 to 11:1, or in a range of 1.5:1 to 7:1.

In an embodiment, the adhesive layer can be formed to have a particular complex viscosity. For instance, complex viscosity can be tuned to be suitable for a lamination process such that oozing problems may be prevented. In a further embodiment, the first polymer, the second polymer, or both can be selected to have a particular melt flow rate for obtaining a desirable complex viscosity. In another embodiment, adjusting the weight content of at least one of the first polymer, the second polymer, and the third polymer can facilitate formation of the adhesive layers having a desired complex viscosity.

The complex viscosity of the adhesive layer is measured using an ARES rotational rheometer (TA Instruments) with a 25 mm parallel plate fixture. Temperature ramp is performed from 350° C. to 405° C. at 1 Hz and at a strain rate of 25%.

In an embodiment, the adhesive layer can have a complex viscosity of at least $8.5 \times 10^3$ Pa·s as measured at 380° C. and 1 rad/s. For instance, the complex viscosity can be at least $8.8 \times 10^3$ Pa·s, at least $9.2 \times 10^3$ Pa·s, at least $9.8 \times 10^3$ Pa·s, at least $10.2 \times 10^3$ Pa·s, or at least $12.4 \times 10^3$ Pa·s as measured at 380° C. and 1 rad/s. In another instance, the complex viscosity may not be greater than $19.8 \times 10^3$ Pa·s as measured at 380° C. and 1 rad/s, such as not greater than $19.3 \times 10^3$ Pa·s, not greater than $18.8 \times 10^3$ Pa·s, not greater than $18.2 \times 10^3$ Pa·s, not greater than $17.8 \times 10^3$ Pa·s, or not greater than $17.5 \times 10^3$ Pa·s as measured at 380° C. and 1 rad/s. It is to be understood that the complex viscosity of the adhesive layer can be in a range including any of the minimum and maximum values disclosed herein. For example, the complex viscosity of the adhesive layer can be in a range of $8.5 \times 10^3$ Pa·s to $19.8 \times 10^3$ Pa·s, such as in a range of $9.2 \times 10^3$ Pa·s to $18.2 \times 10^3$ Pa·s or in a range of $10.2 \times 10^3$ Pa·s to $17.8 \times 10^3$ Pa·s as measured at 380° C. and 1 rad/s.

According to an embodiment, the adhesive layer can have a coefficient of friction. The coefficient of friction can be measured according to ASTM G 77-05. For example, the coefficient of friction can be at least 0.2, such as at least 0.25, at least 0.3, at least 0.35, or at least 0.38. In another instance, the adhesive layer may have a coefficient of friction of not greater than 0.6, such as not greater than 0.58, or not greater than 0.55, or not greater than 0.52, or not greater than 0.5, or not greater than 0.45. It is to be appreciated that the adhesive layer can have a coefficient of friction in a range including any of the minimum and maximum values disclosed herein. For example, the adhesive layer can have a coefficient of friction in a range of 0.2 to 0.6, such as in a range of 0.2 to 0.58, in a range of 0.25 to 0.55, in a range of 0.3 to 0.52, or in a range of 0.35 to 0.45.

In an embodiment, the adhesive layer can be used in a bearing. In an application of such, the bearing can include a substrate layer, and the adhesive layer can be disposed over the substrate layer. In another application, the bearing can also include a sliding layer disposed over the adhesive layer. In a particular application, the adhesive layer can be suitable for a Norglide® bearing.

In a particular embodiment, the adhesive layer can comprise a hot melt adhesive. At a temperature in a range of 350° C. to 400° C., the adhesive layer can melt and form a bonding layer between the substrate layer and the sliding layer. In another application, the adhesive layer can be in direct contact with the substrate layer, the sliding layer, or both.

In an embodiment, the substrate layer can include metal. In another embodiment, the substrate layer can include an alloy. In a particular embodiment, the substrate layer can include aluminum, steel, stainless steel, cold-rolled steel, matt zinc plated steel, or any combination thereof. In a further particular embodiment, the substrate can include iron, carbon, Ni, Zn, Co, Cr, Ti, Zr, Mo or any combination thereof.

In an embodiment, the sliding layer can include a polymer, such as polytetrafluoroethylene, polyether ether ketone, polyetherketone, polyimide, polyamideimide, or any combination thereof. In another embodiment, the sliding layer can include a filler, an additive, an inorganic material, or a combination thereof. For instance, the sliding layer can include carbon, graphite, graphene, CNT, polyesters, glass fiber, carbon fiber, boron nitride, an inorganic filler, or any combination thereof.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

An adhesive layer, comprising:
a first polymer;
a second polymer comprising a fluoropolymer; and
a third polymer comprising a modified fluoropolymer of the second polymer,
wherein:
    the first polymer is different from the second polymer and the third polymer;
    a weight ratio of the second polymer to the third polymer is at least 12:1; and
wherein the adhesive layer has:
    a coefficient of friction of at least 0.2; or
    a normalized peel strength of at least 4.8 N/in/microns; or
    a combination thereof.

Embodiment 2

An adhesive layer, comprising a mixture comprising:
a first polymer;
a second polymer comprising a fluoropolymer; and
a third polymer comprising a modified fluoropolymer of the second polymer,
wherein:
    the first polymer has a first content of not greater than 28 wt. % relative to a total weight of the first polymer, the second polymer, and the third polymer;
    the second polymer has a second content of at least 61 wt. % of the total weight; and
    the third polymer has a third content of not greater than the first content and not greater than the second content.

Embodiment 3

An adhesive layer, comprising:
a first polymer;
a second polymer comprising a fluoropolymer; and
a third polymer comprising a modified fluoropolymer of the second polymer, wherein:
    the first polymer is different from the second polymer and the third polymer;
    a weight ratio of the second polymer to the third polymer in the mixture is at least 12:1; and
wherein the adhesive layer has:
    a ratio of a first elongation at break along a longitudinal direction to a second elongation at break along a transverse direction is at least 1 and not greater than 15;
    a normalized peel strength of at least 4.8 N/in/microns; or
    a combination thereof.

Embodiment 4

A bearing, comprising:
a substrate layer;
an adhesive layer disposed over the substrate; and
a sliding layer disposed over the adhesive layer,
wherein the adhesive layer comprises a:
    a first polymer;
    a second polymer comprising a fluoropolymer; and
    a third polymer comprising a modified fluoropolymer of the second polymer, and
wherein the adhesive layer has:
    a ratio of a first elongation at break along a longitudinal direction to a second elongation at break along a transverse direction is at least 1 and not greater than 15;
    a normalized peel strength of at least 4.8 N/in/microns; or
    a combination thereof.

Embodiment 5

A bearing, comprising:
a substrate layer;
an adhesive layer disposed over the substrate layer; and
a sliding layer disposed over the adhesive layer,
wherein the adhesive layer comprises:
    a first polymer;
    a second polymer comprising a fluoropolymer; and
    a third polymer comprising a modified fluoropolymer of the second polymer and has a content of not greater than 5 wt. % relative to a total weight of the first polymer, the second polymer, and the third polymer, and
wherein the adhesive layer has one of the following properties:
    a ratio of a first elongation at break along a longitudinal direction to a second elongation at break along a transverse direction is at least 1 and not greater than 15; and
    a complex viscosity of:
        at least $8.5 \times 10^3$ Pa·s as measured at 380° C. and 1 rad/s;
        not greater than $19.8 \times 10^3$ Pa·s as measured at 380° C. and 1 rad/s; or
        a combination thereof.

Embodiment 6

A method of making an adhesive layer having a particular complex viscosity, comprising:
selecting a first polymer having a first melt flow rate in a range of 3 grams/10 minutes to 15 grams/10 minutes at 380° C. as measured by ASTM D-1238;

selecting a second polymer comprising a fluoropolymer and having a second melt flow rate in a range of 2 grams/10 minutes to to7 grams/10 minutes at 380° C. as measured by ASTM D-1238;

forming a mixture comprising the first polymer, the second polymer, and a third polymer for making the adhesive layer, wherein:
  the third polymer comprises a modified fluoropolymer of the second polymer; and
  the first polymer is different from the second polymer and the third polymer; and adjusting a weight content of at least one of the first polymer, the second polymer, and the third polymer in the mixture to obtain the particular complex viscosity of the adhesive layer, wherein the adhesive layer has:
  a ratio of a first elongation at break along a longitudinal direction to a second elongation at break along a transverse direction of at least 1:1 and not greater than 15:1;
  a normalized peel strength of at least 4.8 N/in/micrometers; or
  a combination thereof.

Embodiment 7

A method of forming an adhesive layer, comprising:
adding a third polymer to a first polymer and a second polymer to form a mixture including a uniform dispersion of the first polymer, the second polymer, and the third polymer, wherein:
  90% of the first polymer inside the second polymer has a domain size not greater than 20 microns;
  the first polymer has a first melting temperature;
  the second polymer has a second melting temperature; and
  the mixture has a third melting temperature and a fourth melting temperature that are between the first melting temperature and the second melting temperature; and
extruding the mixture to form the adhesive layer,
wherein the third polymer comprises a modified fluoropolymer of the second polymer.

Embodiment 8

The method of Embodiment 6 or 7, wherein:
the first polymer is immiscible with the second polymer;
the first polymer has a weight content higher than 17 wt. % relative to a total weight of the first polymer, the second polymer, and the third polymer; and
the mixture including the first, second, and third polymers is capable of being compounded with a twin-screw compounder.

Embodiment 9

The adhesive, the bearing, or the method of any one of the preceding Embodiments, wherein the modified fluoropolymer comprises a functional group comprising a hydroxyl group (—OH), an carbonyl fluoride (—COF), a carboxyl group (—COOH), a maleic anhydride group (—(CH CO)$_2$O), an acrylate group (—CH$_2$=CHCOOH), a glycidyl methacrylate group (—CH$_2$C(CH$_3$) COOCH$_2$(CHCH$_2$O)), or a combination thereof.

Embodiment 10

The adhesive, the bearing, or the method of any one of the preceding Embodiments, wherein the first polymer comprises an aromatic polyester, a polyphenylene ether (PPE), a liquid crystal polymer (LCP), a polyether ether ketone (PEEK), a polyaryletherketones (PAEK), a polyether ketone (PEK), polyimide (PI), a polyamideimide (PAI), thermoplastic polyimide (PI), polyetherimide (PEI), Polyethersulfone (PES), Polyphenylene sulfide (PPS), polyphenylsulfone (PPSU), polyphthalamide (PPA), polycarbonate (PC), aromatic and linear polyamides, or a combination thereof.

Embodiment 11

The adhesive, the bearing, or the method of any one of the preceding Embodiments, wherein the first polymer comprises PEEK.

Embodiment 12

The adhesive, the method, or the bearing of any one of the preceding Embodiments, wherein the second polymer consists essentially of the fluoropolymer.

Embodiment 13

The adhesive, the bearing, or the method of any one of the preceding Embodiments, wherein the fluoropolymer comprises a perfluoroalkoxyethylene (PFA), a ethylene-tetrafluoroethylene (ETFE), a tetrafluoroethylene-hexafluoropropylene (FEP), a tetrafluoro-ethylene-perfluoro(methyl vinyl either)(MFA) and an ethylene chlorotrifluoroethylene copolymer (ECTFE), or a combination thereof.

Embodiment 14

The adhesive, the method, or the bearing of any one of the preceding Embodiments, wherein the fluoropolymer comprises PFA or ETFE.

Embodiment 15

The adhesive, the method, or the bearing of any one of the preceding Embodiments, wherein the second polymer consists essentially of PFA or ETFE.

Embodiment 16

The adhesive, the method, or the bearing of any one of the preceding Embodiments, wherein the third polymer consists essentially of the modified fluoropolymer.

Embodiment 17

The adhesive, the method, or the bearing of any one of the preceding Embodiments, wherein the modified fluoropolymer comprises a modified PFA, modified ETFF, modified MFA, or a combination thereof.

Embodiment 18

The adhesive, the method, or the bearing of any one of the preceding Embodiments, wherein the third polymer consists essentially of a modified PFA or a modified ETFE.

Embodiment 19

The adhesive, the method, or the bearing of any one of the preceding Embodiments, wherein the first weight content of the first polymer is at least 1 wt. %, or at least 8 wt. %, or at least 11 wt. %, or at least 18 wt. %.

Embodiment 20

The adhesive, the method, or the bearing of any one of the preceding Embodiments, wherein the first weight content of the first polymer is not greater than 28 wt. %, or not greater than 25 wt. %, not greater than 23 wt. %, or not greater than 20 wt. %.

Embodiment 21

The adhesive, the method, or the bearing of any one of the preceding Embodiments, wherein the first weight content of first polymer is in a range of 1 wt. % to 28 wt. %, or in a range of 8 wt. % to 25 wt. %, or in a range of 11 wt. % to 23 wt. %, or in a range of 18 wt. % to 20 wt. %.

Embodiment 22

The adhesive, the method, or the bearing of any one of the preceding Embodiments, wherein the second weight content of the second polymer is at least 63 wt. %, or at least 68 wt. %, or at least 73 wt. %.

Embodiment 23

The adhesive, the method, or the bearing of any one of the preceding Embodiments, wherein the second weight content of the second polymer is not greater than 98.5 wt. %, or not greater than 93 wt. %, or not greater than 90 wt. %.

Embodiment 24

The adhesive, the method, or the bearing of any one of the preceding Embodiments, wherein the second weight content of second polymer is in a range of 63 wt. % to 98.5 wt. %, or in a range of 68 wt. % to 93 wt. %, or in a range of 73 wt. % to 90 wt. %.

Embodiment 25

The adhesive, the method, or the bearing of any one of the preceding Embodiments, wherein the third polymer has a third content of not greater than 5 wt. %.

Embodiment 26

The adhesive, the method, or the bearing of any one of the preceding Embodiments, wherein the third weight content of the third polymer is at least 0.5 wt. %, or at least 0.9 wt. %, or at least 1.6 wt. %.

Embodiment 27

The adhesive, the method, or the bearing of any one of the preceding Embodiments, wherein the third weight content of the third polymer is not greater than 5 wt. %, or not greater than 4.6 wt. %, or not greater than 3.4 wt. %.

Embodiment 28

The adhesive, the method, or the bearing of any one of the preceding Embodiments, wherein the third weight content of third polymer is in a range of 0.5 wt. % to 5 wt. %, or in a range of 0.9 wt. % to 4.6 wt. %, or in a range of 1.6 wt. % to 3.4 wt. %.

Embodiment 29

The adhesive, the method, or the bearing of any one of the preceding Embodiments, wherein a weight ratio of the second polymer to the third polymer in the mixture is at least 12:1, or at least 13:1, or at least 14:1.

Embodiment 30

The adhesive, the method, or the bearing of any one of the preceding Embodiments, wherein a weight ratio of the second polymer to the third polymer in the mixture is not greater than 197:1, or not greater than 85:1, or not greater than 45:1.

Embodiment 31

The adhesive, the method, or the bearing of any one of the preceding Embodiments, wherein a weight ratio of the second polymer to the third polymer in the mixture is in a range of 12:1 to 197:1, or in a range of 13:1 to 85:1, or in a range of 14:1 to 45:1.

Embodiment 32

The adhesive, the method, or the bearing of any one of the preceding Embodiments, wherein a weight ratio of the second polymer to the first polymer in the mixture is at least 2:1, or at least 3:1, or at least 4:1.

Embodiment 33

The adhesive, the method, or the bearing of any one of the preceding Embodiments, wherein a weight ratio of the second polymer to the first polymer in the mixture is not greater than 24:1, or not greater than 18:1, or not greater than 9:1.

Embodiment 34

The adhesive, the method, or the bearing of any one of the preceding Embodiments, wherein a weight ratio of the second polymer to the first polymer in the mixture is in a range of 2:1 to 24:1, or in a range of 3:1 to 18:1, or in a range of 4:1 to 9:1.

Embodiment 35

The adhesive, the method, or the bearing of any one of the preceding Embodiments, wherein a weight ratio of the first polymer to the third polymer in the mixture is at least 1:1, or at least 2:1, or at least 3:1.

Embodiment 36

The adhesive, the method, or the bearing of any one of the preceding Embodiments, wherein a weight ratio of the first polymer to the third polymer in the mixture is not greater than 55:1, or not greater than 34:1, or not greater than 20:1.

Embodiment 37

The adhesive, the method, or the bearing of any one of the preceding Embodiments, wherein a weight ratio of the first polymer to the third polymer in the mixture is in a range of 1:1 to 55:1, or in a range of 2:1 to 34:1, or in a range of 3:1 to 20:1.

Embodiment 38

The adhesive, the method, or the bearing of any one of the preceding Embodiments, wherein the adhesive layer has a thickness of at least 15 microns, or at least 20 microns, or at least 25 microns.

Embodiment 39

The adhesive, the method, or the bearing of any one of the preceding Embodiments, wherein the adhesive layer has the thickness of not greater than 56 microns, or not greater than 48 microns, or not greater than 43 microns.

Embodiment 40

The adhesive, the method, or the bearing of any one of the preceding Embodiments, wherein the adhesive layer has the thickness in a range of 15 microns to 56 microns, or in a range of 20 microns to 48 microns, or in a range of 25 microns to 43 microns.

Embodiment 41

The adhesive layer, the method, or the bearing of any one of the preceding Embodiments, wherein the adhesive layer comprises a hot melt adhesive.

Embodiment 42

The adhesive layer or the method of the preceding Embodiments, wherein the adhesive layer melts and forms a bonding layer between the sliding layer and the substrate layer at a temperature in a range of 350° C. to 400° C.

Embodiment 43

The adhesive, the method, or the bearing of any one of the preceding Embodiments, wherein the adhesive layer has the coefficient of friction of at least 0.2, or at least 0.25, or at least 0.3, or at least 0.35.

Embodiment 44

The adhesive, the method, or the bearing of any one of the preceding Embodiments, wherein the adhesive layer has the coefficient of friction of not greater than 0.6, or not greater than 0.55, or not greater than 0.5, or not greater than 0.45.

Embodiment 45

The adhesive, the method, or the bearing of any one of the preceding Embodiments, wherein the adhesive layer has the coefficient of friction in a range of 0.2 to 0.6, or in a range of 0.25 to 0.55, or in a range of 0.3 to 0.5, or in a range of 0.35 to 0.45.

Embodiment 46

The adhesive, the method, or the bearing of any one of the preceding Embodiments, wherein the adhesive layer has the normalized peel strength of at least 4.8 N/in/microns, or at least 5.3 N/in/microns, or at least 5.5 N/in/microns.

Embodiment 47

The adhesive, the method, or the bearing of any one of the preceding Embodiments, wherein the adhesive layer has the peel strength of not greater than 7.3 N/in/microns, or not greater than 7.1 N/in/microns, or not greater than 6.3 N/in/microns.

Embodiment 48

The adhesive, the method, or the bearing of any one of the preceding Embodiments, wherein the adhesive layer has the peel strength in a range of 4.8N/in/microns to 7.3 N/in/microns, or in a range of 5.3 N/in/microns to 7.1 N/in/microns, or in a range of 5.5 N/in/microns to 6.3 N/in/microns.

Embodiment 49

The adhesive, the method, or the bearing of any one of the preceding Embodiments, wherein the adhesive layer has an elongation at break along a longitudinal direction that is not less than an elongation at break along a transverse direction.

Embodiment 50

The adhesive, the method, or the bearing of any one of the preceding Embodiments, wherein the elongation at break along the longitudinal direction of the adhesive layer is at least 85%, or at least 95%, or at least 105%.

Embodiment 51

The adhesive, the method, or the bearing of any one of the preceding Embodiments, wherein the elongation at break along the longitudinal direction of the adhesive layer is not greater than 200%, or not greater than 170%, or not greater than 150%.

Embodiment 52

The adhesive, the method, or the bearing of any one of the preceding Embodiments, wherein the adhesive layer has the elongation at break along the longitudinal direction of the adhesive layer in a range of 85% to 200%, or in a range of 95% to 170%, or in a range of 105% to 150%.

Embodiment 53

The adhesive, the method, or the bearing of any one of the preceding Embodiments, wherein the elongation at break along the transverse direction of the adhesive layer is at least 55%, or at least 65%, or at least 70%.

Embodiment 54

The adhesive, the method, or the bearing of any one of the preceding Embodiments, wherein the elongation at break along the transverse direction of the adhesive layer is not greater than 95%, or not greater than 85%, or not greater than 80%.

Embodiment 55

The adhesive, the method, or the bearing of any one of the preceding Embodiments, wherein the elongation at break along the transverse direction of the adhesive layer is in a range of 55% to 95%, or in a range of 65% to 85%, or in a range of 70% to 80%.

Embodiment 56

The adhesive, the method, or the bearing of any one of the preceding Embodiments, wherein the adhesive layer has a ratio of the elongation at break along the longitudinal direction to the elongation at break along the transverse direction of at least 1:1, or at least 1.2:1, or at least 1.5:1.

Embodiment 57

The adhesive, the method, or the bearing of any one of the preceding Embodiments, wherein the adhesive layer has a ratio of the elongation at break along the longitudinal direction to the elongation at break along the transverse direction of not greater than 15:1, or not greater than 11:1, or not greater than 7:1.

Embodiment 58

The adhesive, the method, or the bearing of any one of the preceding Embodiments, wherein the adhesive layer has a ratio of the elongation at break along the longitudinal direction to the elongation at break along the transverse direction in a range of 1:1 to 15:1, or in a range of 1.2:1 to 11:1, or in a range of 1.5:1 to 7:1.

Embodiment 59

The adhesive, the method, or the bearing of any one of the preceding Embodiments, wherein a difference between the elongation at break along the longitudinal direction and that along the transverse direction is not greater than 190%, or not greater than 150%, not greater than 110%.

Embodiment 60

A method of forming a bearing, comprising:
disposing the adhesive layer of any one of the preceding Embodiments over a substrate; and
disposing a sliding layer over the adhesive layer.

Embodiment 61

The bearing or the method of any one of the preceding Embodiments, wherein the substrate comprises a metal, an alloy, or a combination thereof.

Embodiment 62

The bearing or the method of any one of the preceding Embodiments, wherein the substrate comprises aluminum, steel, stainless steel, cold-rolled steel, matt zinc plated steel, or any combination thereof.

Embodiment 63

The bearing or the method of any one of the preceding Embodiments, wherein the sliding layer comprises polytetrafluoroethylene, polyether ether ketone, polyetherketone, polyimide, polyamideimide, and any combination thereof.

Embodiment 64

The bearing or the method of any one of the preceding Embodiments, wherein the sliding layer comprises a filler, an additive, an inorganic material, or a combination thereof.

EXAMPLES

Example 1

Figure 1:
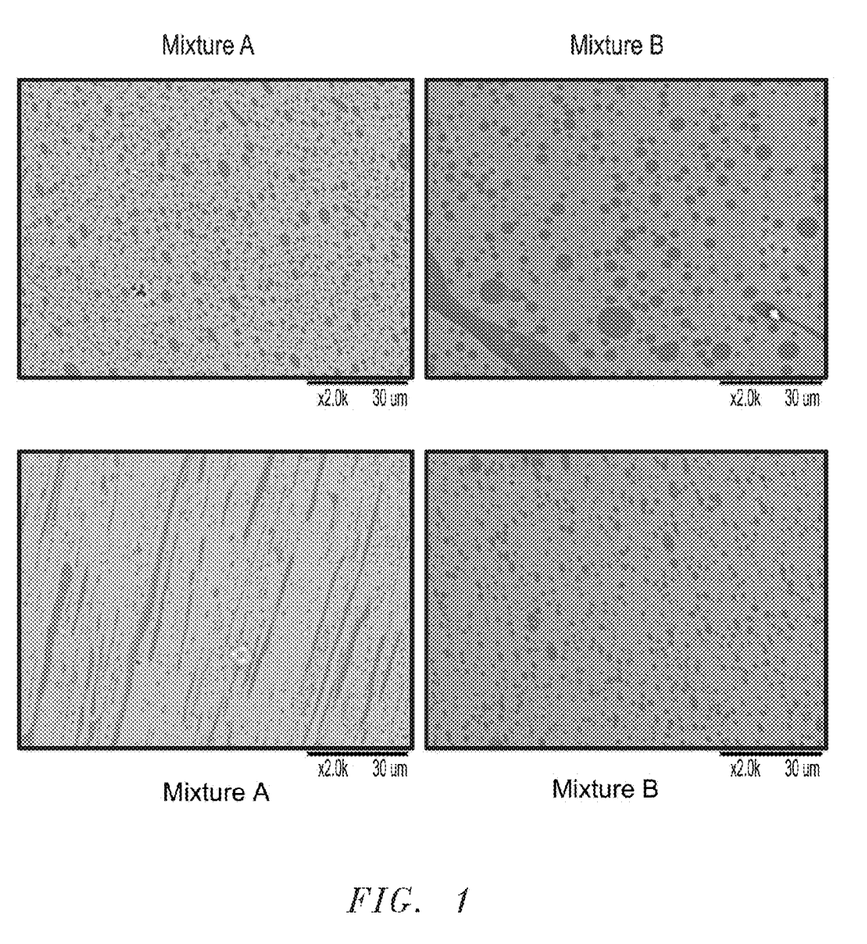
FIG. 1 includes images of a blend according to an embodiment disclosed herein and a conventional blend.

Two mixtures were prepared and tested. Mixture A includes 80 wt. % PFA and 20 wt. % PEEK. Mixture B includes 77.6 wt. % PFA, 19.4 wt. % PEEK, and 3 wt. % modified PFA that was obtained by attaching maleic anhydride groups to PFA through synthesis. A twin-screw compounder was used to blend the polymers to form the mixtures. FIG. 1 includes scanning electronic microscopic images of mixture A and mixture B. The images show the mixtures in the transversal (top panel) and extrusion (bottom) directions. As shown in both images, PEEK (the darker locations) is dispersed in a matrix of PFA (lighter locations). There is no significant difference of dispersion of PEEK in Mixture A and B in the transversal direction. In the extrusion direction, domains of PEEK coalesced to form strings in Mixture A, which resulted in domain sizes varying from a few microns to hundreds of microns. However, in the extrusion direction, PEEK in Mixture B maintains the morphology observed in the transversal direction.

Example 2

Adhesive layer samples were prepared based on the compositions included in Table 1 below. Samples C and D were formed using a twin-screw compounder at 380° C. and then cut into small pellets. The resulted pellets of samples C and D, sample A, and sample B were extruded into films of 30 µm thick using a single screw extruder. At least 5 tensile testing samples were cut from the extruded film from each composition in both extrusion direction and transversal direction. Elongations at break and tensile stress at break in the transversal and extrusion directions were tested the samples.

TABLE 1

| Adhesive Layer Samples | Composition |
| --- | --- |
| A | 100 wt. % PFA |
| B | 100 wt. % modified PFA |
| C | 82.5 wt. % PFA, 14.5 wt. % PEEK, and 3 wt. % modified PFA |
| D | 85 wt. % PFA and 15 wt. % PEEK |

Figure 2:
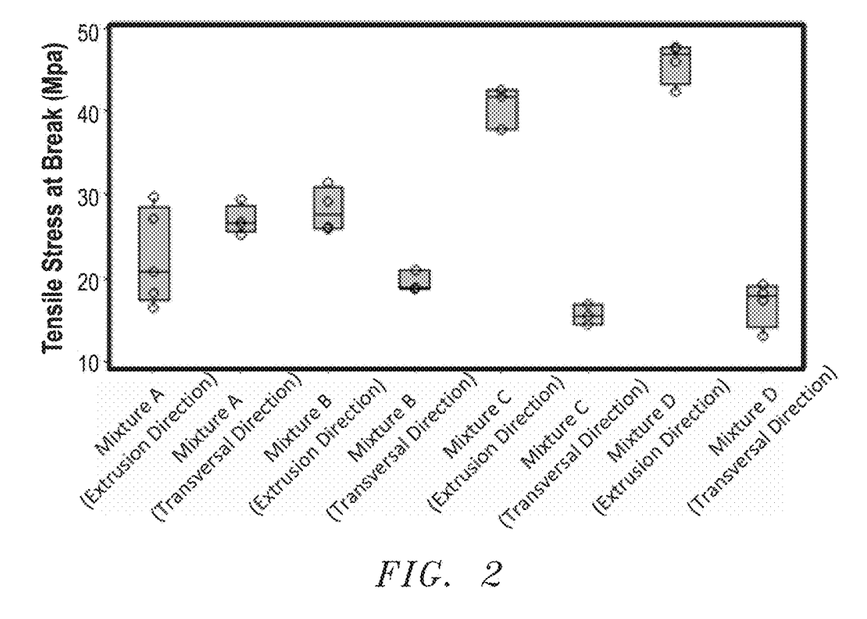
FIG. 2 includes a graph of tensile stress at break of adhesive layers according to embodiments herein and conventional adhesive layers.
Figure 3:
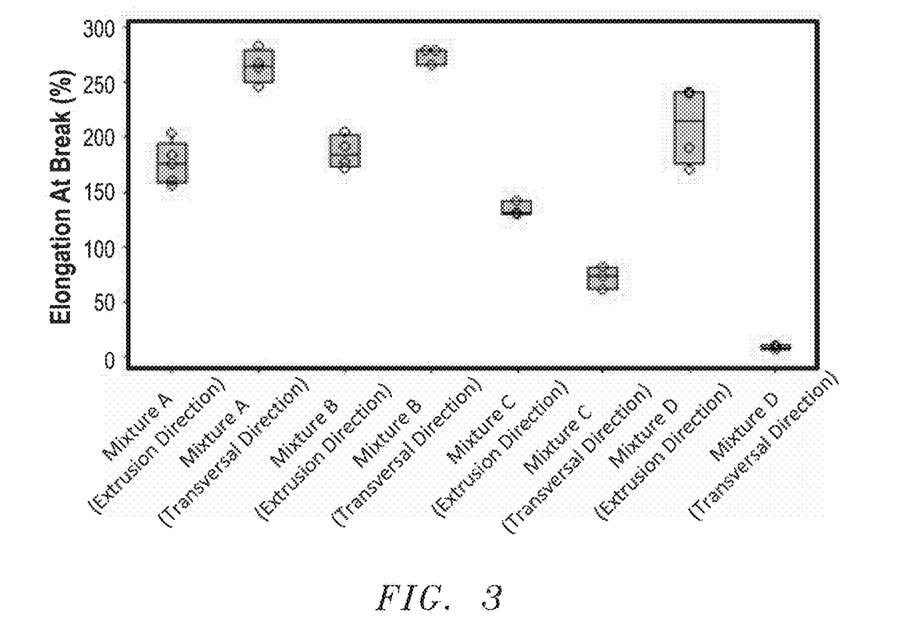
FIG. 3 includes a graph of elongations at break of adhesive layers according to embodiments herein and conventional adhesive layers.

FIG. 2 includes a summary of the test results of tensile stress at break in the transversal and extrusion directions (indicated as TD and ED in FIGS. 2 and 3, respectively). The tensile strength in the extrusion direction of compositions C and D is significantly higher than that of compositions A and B. FIG. 3 includes a summary of the test results of elongations at break in the transversal and extrusion directions. The elongations at break of composition C were approximately 125% in the extrusion direction and 70% in the transversal direction, respectively, while those of composition D were approximately 225% in the extrusion direction and 10% in the transversal direction, respectively. It could be seen that including modified PFA in the mixture of PFA and PEEK could significantly reduce the differences of elongations at break between the extrusion direction and the transversal direction.

Example 3

Adhesive layer samples of compositions A to D in Table 1 were formed all having the same thickness of 30 microns and subjected to the T-peel tests for measuring peel strength. Each layer was tested in a 5-layer laminate structure prepared as disclosed herein. Three types of sliding layers were used for testing each adhesive layer composition, and compositions of the sliding layers are included in Table 2. Lamination was performed at 0.5 MPa and 380° C. degrees for 5 minutes to allow bonding between the layers. The T-peel tests were conducted according to ASTM D1876-01. The test results are included in FIG. 4.

TABLE 2

| Sliding Layer | Composition |
|---|---|
| 1 | PTFE and carbon and graphite filler |
| 2 | PTFE and glass fiber filer |
| 3 | PTFE and Ekonol filler |

Figure 4:
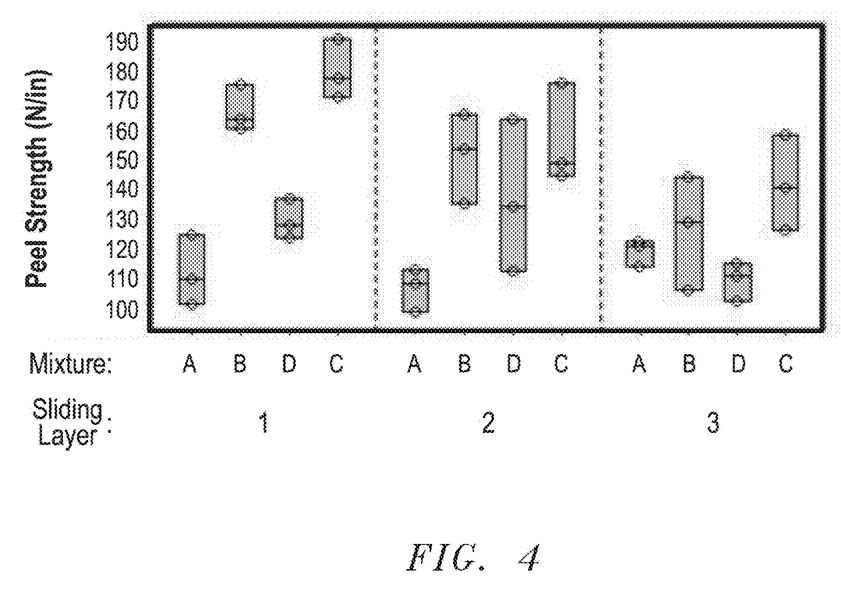
FIG. 4 includes a graph of peel strength of adhesive layers according to embodiments herein and conventional adhesive layers.

As illustrated in FIG. 4, when sliding layer 1 was used, adhesive layers of compositions A, B, and D demonstrated peel strength of approximately 110 N/in, 160 N/in, 125 N/in, respectively, while composition C had peel strength of approximately 175 N/in. For sliding layer 2, compositions A, B, and D demonstrated peel strength of approximately 110 N/in, 155 N/in, 135 N/in, and composition C had peel strength of approximately 150 N/in. For sliding layer 3, peel strength for compositions A, B, and D was approximately 120 N/in, 130 N/in, and 110 N/in, respectively, while composition C had peel strength of 140 N/in. Compared to the mixture of PFA and PEEK, blending PFA and PEEK with modified PFA could improve peel strength of the adhesive layer.

Embodiments disclosed herein represent a departure from the state of the art. The adhesively layer of embodiments herein can include a first polymer, a second polymer, and a third polymer including a modified fluoropolymer of the second polymer. Certain embodiments utilize a weight ratio between the second polymer and the third polymer. Some embodiments utilize weight contents of the first, second, and/or third polymers. Particularly, the weight content of the third polymer can be adjusted to achieve a desired property of the adhesive layer. Unexpectedly, adding the third polymer to the first and second polymers, even at a weight content not greater than 5 wt. %, can cause a uniform dispersion to form, allowing formation of the adhesive layer with improved properties (e.g., peel strength, elongation at break in the transversal direction). Moreover, by selecting melt flow rates and adjusting the weight contents of the polymers, the resulted adhesive layer can have various complex viscosities to allow the adhesive layer to be suitable for different applications.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing, comprising:
a substrate layer;
a sliding layer; and
an adhesive layer disposed between the substrate and the sliding layer,
wherein the adhesive layer comprises:
a first polymer comprising an aromatic polyester, a polyphenylene ether (PPE), a liquid crystal polymer (LCP), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polycarbonate (PC), aromatic and linear polyamides, or a combination thereof;
a second polymer comprising a fluoropolymer comprising a perfluoroalkoxyethylene (PFA), a ethylenetetrafluoroethylene (ETFE), a tetrafluoroethylene-hexafluoropropylene (FEP), a tetrafluoro-ethylene-perfluoro(methyl vinyl either) (MFA) and an ethylene chlorotrifluoroethylene copolymer (ECTFE), or a combination thereof; and
a third polymer comprising a modified fluoropolymer of the second polymer,
wherein the first polymer is different from the second polymer and the third polymer and has a first content of at least 8 wt. % and not greater than 28 wt. % relative to a total weight of the first polymer, the second polymer, and the third polymer; and
wherein a weight ratio of the second polymer to the third polymer is at least 12:1; and
wherein the adhesive layer has a normalized peel strength of at least 4.8 N/in/microns.

2. The bearing of claim 1, wherein the third polymer has a content of at least 0.5 wt. % and not greater than 5 wt. % relative to a total weight of the first polymer, the second polymer, and the third polymer.

3. The bearing of claim 1, wherein a weight ratio of the first polymer to the third polymer is at least 2:1.

4. The bearing of claim 1, wherein the modified fluoropolymer comprises a functional group comprising a hydroxyl group (—OH), an carbonyl fluoride (—COF), a carboxyl group (—COOH), a maleic anhydride group (—(CH CO)$_2$O), an acrylate group (—CH$_2$=CHCOOH), a glycidyl methacrylate group (—CH$_2$C(CH$_3$) COOCH$_2$(CHCH$_2$O)), or a combination thereof.

5. The bearing of claim 1, wherein the first polymer comprises a polyether ether ketone (PEEK).

6. The bearing of claim 5, wherein the fluoropolymer comprises a perfluoroalkoxyethylene (PFA), a ethylene-tetrafluoroethylene (ETFE), a tetrafluoroethylene-hexafluoropropylene (FEP), or a combination thereof.

7. The bearing of claim 6, wherein the modified fluoropolymer comprises a modified PFA, modified ETFE, or a combination thereof.

8. The bearing of claim 1, wherein the adhesive layer has a thickness in a range of 15 microns to 56 microns.

9. A bearing, comprising:
a substrate layer; and
an adhesive layer disposed over the substrate layer,
wherein the adhesive layer comprises:
  a first polymer comprising an aromatic polyester, a polyphenylene ether (PPE), a liquid crystal polymer (LCP), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polycarbonate (PC), aromatic and linear polyamides, or a combination thereof;
  a second polymer comprising a fluoropolymer comprising a perfluoroalkoxyethylene (PFA), a ethylene-tetrafluoroethylene (ETFE), a tetrafluoroethylene-hexafluoropropylene (FEP), a tetrafluoro-ethylene-perfluoro(methyl vinyl either)(MFA) and an ethylene chlorotrifluoroethylene copolymer (ECTFE), or a combination thereof; and
  a third polymer comprising a modified fluoropolymer of the second polymer, wherein:
    the first polymer has a first content of at least 5 wt. % and not greater than 28 wt. % relative to a total weight of the first polymer, the second polymer, and the third polymer;
    the second polymer has a second content of at least 61 wt. % of the total weight; and
    the third polymer has a third content of not greater than the first content and not greater than the second content,
  wherein the bearing further comprises a sliding layer, wherein the adhesive layer is disposed between the substrate and the sliding layer.

10. The bearing of claim 9, wherein the first polymer has a first weight content in a range of 8 wt. % to 28 wt. %.

11. The bearing of claim 9, wherein the second polymer has a second weight content in a range of 63 wt. % to 98.5 wt. %.

12. The bearing of claim 9, wherein the third weight content is in a range of 0.5 wt. % to 5 wt. %.

13. The bearing of claim 9, wherein the first polymer comprises a polyether ether ketone (PEEK), the second polymer comprises a perfluoroalkoxyethylene (PFA), and the third polymer comprises a modified perfluoroalkoxyethylene (PFA).

14. A method of forming a bearing, comprising:
forming an adhesive layer; and
disposing the adhesive layer over a substrate,
wherein forming the adhesive layer comprises:
  forming a uniform dispersion of a first polymer, a second polymer, and a third polymer, wherein:
    the first polymer comprises an aromatic polyester, a polyphenylene ether (PPE), a liquid crystal polymer (LCP), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polycarbonate (PC), aromatic and linear polyamides, or a combination thereof:
    the second polymer comprises a fluoropolymer comprising perfluoroalkoxyethylene (PFA), a ethylene-tetrafluoroethylene (ETFE), a tetrafluoroethylene-hexafluoropropylene (FEP), a tetrafluoroethylene-perfluoro(methyl vinyl either)(MFA) and an ethylene chlorotrifluoroethylene copolymer (ECTFE), or a combination thereof;
    the third polymer comprises a modified fluoropolymer of the second polymer;
    at least 90% of the first polymer are within a phase of the second polymer and has a domain size not greater than 20 microns; and
  extruding the mixture to form the adhesive layer,
wherein:
  the first polymer has a first content of least 5 wt. % and not greater than 28 wt. % relative to a total weight of the first polymer, the second polymer, and the third polymer;
  the second polymer has a second content of at least 61 wt. % of the total weight;
  the third polymer has a third content of not greater than first content and not greater than the second content; and
  the bearing further comprises a sliding layer, and the adhesive layer is disposed between the substrate and the sliding layer.

15. The method of claim 14, wherein:
the first polymer is immiscible with the second polymer;
the first polymer has a weight content higher than 17 wt. % relative to a total weight of the first polymer, the second polymer, and the third polymer; and
the mixture including the first, second, and third polymers is capable of being compounded with a twin-screw compounder.

16. The method of claim 14, wherein the adhesive layer comprises a complex viscosity of:
at least $8.5 \times 10^3$ Pa·s as measured at 380° C. and 1 rad/s;
not greater than $19.8 \times 10^3$ Pa·s as measured at 380° C. and 1 rad/s; or
a combination thereof.

17. The method of claim 14, wherein the adhesive layer comprises a ratio of a first elongation at break along a longitudinal direction to a second elongation at break along a transverse direction is at least 1 and not greater than 15.

18. The method of claim 14, wherein the adhesive layer melts and forms a bonding layer between the sliding layer and the substrate layer at a temperature in a range of 350° C. to 400° C.

19. The method of claim 14, wherein the adhesive layer has the normalized peel strength of at least 4.8 N/in/microns.

* * * * *

UNITED STATES PATENT AND TRADEMARK OFFICE
CERTIFICATE OF CORRECTION

PATENT NO. : 10,253,811 B2
APPLICATION NO. : 15/275114
DATED : April 9, 2019
INVENTOR(S) : Jing Dong et al.

It is certified that error appears in the above-identified patent and that said Letters Patent is hereby corrected as shown below:

In the Claims

In Column 24, Claim 14, Line 14, please delete "(PAT)", and insert --(PAI)--

In Column 24, Claim 14, Line 19, please delete "thereof:", and insert --thereof;--

In Column 24, Claim 14, Line 34, please delete "of least", and insert --of at least--

In Column 24, Claim 14, Line 40-41, please delete "than first", and insert --than the first--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*